(12) United States Patent
Sirol et al.

(10) Patent No.: US 9,181,366 B2
(45) Date of Patent: Nov. 10, 2015

(54) POLYETHYLENE PREPARED WITH SUPPORTED LATE TRANSITION METAL CATALYST SYSTEMS

(71) Applicant: TOTAL RESEARCH & TECHNOLOGY FELUY, Seneffe (BE)

(72) Inventors: Sabine Sirol, Horrues (BE); Olivier Lhost, Havre (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 0 days.

(21) Appl. No.: 14/324,402

(22) Filed: Jul. 7, 2014

(65) Prior Publication Data

US 2014/0323675 A1 Oct. 30, 2014

Related U.S. Application Data

(62) Division of application No. 13/502,158, filed as application No. PCT/EP2010/066320 on Oct. 28, 2010, now Pat. No. 8,822,612.

(30) Foreign Application Priority Data

Oct. 29, 2009 (EP) .................................... 09174498

(51) Int. Cl.
*C08F 110/02* (2006.01)
*C08F 10/02* (2006.01)

(52) U.S. Cl.
CPC ............... *C08F 110/02* (2013.01); *C08F 10/02* (2013.01)

(58) Field of Classification Search
CPC .. C08F 10/02; C08F 2500/09; C08F 2500/10; C08F 2500/20
USPC ................... 526/348, 352; 528/396
See application file for complete search history.

(56) References Cited

U.S. PATENT DOCUMENTS

| 5,866,663 | A | * | 2/1999 | Brookhart et al. ............ 526/170 |
| 5,880,241 | A | | 3/1999 | Brookhart et al. |
| 6,306,986 | B1 | * | 10/2001 | Teasley ......................... 526/161 |
| 6,310,167 | B1 | * | 10/2001 | Kanzawa et al. ............. 526/352 |
| 8,470,947 | B2 | * | 6/2013 | Kawashima et al. ......... 526/352 |
| 2002/0058768 | A1 | * | 5/2002 | Mackenzie et al. .......... 526/172 |
| 2006/0199727 | A1 | | 9/2006 | Brookhart et al. |

FOREIGN PATENT DOCUMENTS

| CN | 1174003 C | 11/2004 | | |
| EP | 0 890 581 A1 | 1/1999 | | |
| EP | 0890581 A1 | 1/1999 | | |
| JP | 2007-177183 A | * | 7/2007 | ............. C08L 23/04 |
| JP | 2007-197722 A | * | 8/2007 | ............. C08L 23/08 |
| WO | 9623010 A2 | 8/1996 | | |
| WO | 9827124 A1 | 6/1998 | | |
| WO | 9837110 A1 | 8/1998 | | |
| WO | WO 2006/067179 A1 | * | 6/2006 | ............. C08L 23/06 |
| WO | 2008113680 A1 | 9/2008 | | |

OTHER PUBLICATIONS

Xu, J.; Xu, X.; Zheng, Q.; Feng, L.; Chen, W. Eur. Polym. J., 2002, 38, 365-375.*
Xu J. et al., "Dynamic rheological behaviors of metallocene-based ethylene-butene copolymers and their blends with low-density polyethylene", European Polymer Journal, Pergamon Press Ltd. Oxford, GB, vol. 38, No. 2, Feb. 1, 2002, pp. 365-375.
Communication pursuant to Article 94(3) EPC issued in European Application No. 10778604.8-1302 dated May 20, 2014 (5 pages).
H. Mavridis, et al., "Temperature Dependence of Polyolefin Melt Rheology", Polymer Engineering and Science, vol. 32, pp. 1778-1791, 1992.
L K. Johnson, et al., "New Pd(II)- and Ni(II)-Based Catalysts for Polymerization of Ethylene and a-Olefins", Journal of American Chemical Society, 117, 6414-6415, 1995.
Office Action issued in Chinese Application No. 201080049009.1 dated Jun. 26, 2014, and English translation thereof (14 pages).

* cited by examiner

*Primary Examiner* — Rip A Lee

(57) ABSTRACT

The present invention relates to the field of ethylene polymerisation with a supported late transition metal catalyst system.

17 Claims, 2 Drawing Sheets

POLYETHYLENE PREPARED WITH SUPPORTED LATE TRANSITION METAL CATALYST SYSTEMS

CROSS-REFERENCE TO RELATED APPLICATIONS

This application is a divisional of U.S. application Ser. No. 13/502,158, filed on Jul. 17, 2012, now issued as U.S. Pat. No. 8,822,612, which is claims the benefit of PCT/EP2010/066320, filed on Oct. 28, 2010, which claims priority from EP09174498.7, filed on Oct. 29, 2009.

BACKGROUND OF THE INVENTION

The present invention relates to the preparation and characterisation of polyethylene prepared with supported late transition metal catalyst systems.

BRIEF DESCRIPTION OF THE RELATED ART

DuPont has developed, under the name "Versipol", a new family of polyethylene catalysts, based on late transition metals. The catalyst components are disclosed in detail in WO96/23010, WO98/27124, WO98/37110 or in Johnson et al. (L. K. Johnson, C. M. Killian and M. Brookhart in Journal of American Chemical Society, 117, 6414, 1995). These catalyst components consist mainly of nickel-, palladium- or iron-based complexes containing diimine ligands. Polymerisation of ethylene carried out with bidentate α-diimine ligands are described in literature. The polymers display some Interesting features such as:
- They have a very large content of short chain branching, even in the absence of comonomer in the polymerisation reactor. This is explained in terms of 'chain walking mechanism', due to continuous internal rearrangements of the polymer-catalyst complex during polymerisation. Such specificity presents a significant advantage as it suppresses the need to introduce costly comonomers during polymerisation.
- They can incorporate polar comonomers such as acrylate, inside the polyethylene growing chain. It is hoped that this property could lead to the preparation of "barrier polyethylene grades".

U.S. Pat. No. 5,880,241 discloses a process for polymerising ethylene, acyclic olefins, cyclic olefins, olefinic esters or carboxylic acids with late transition metal compounds and optional co-catalysts. The polymers produced have novel microstructure, have a large number of small branches, such as methyl, ethyl and propyl and higher branches. They can advantageously be used as elastomers, moulding resins or in adhesives.

The activity of these polymerisation catalyst systems remains however sometimes far from optimal. There is thus a need to develop other polymerisation conditions and to study their influence on the properties of the polymers.

SUMMARY OF THE INVENTION

It is an objective of the present invention to use a supported late transition catalyst component in the polymerisation of ethylene and alpha-olefins.

It is also an objective of the present invention to use various activators in combination with the supported late transition compounds in order to improve their activity.

It is another objective of the present invention to relate the properties of the resulting polymers to the nature of the catalyst component and activator.

In accordance with the present invention, the foregoing objectives are realised as described in the independent claims. The preferred embodiments are defined in the dependent claims.

DETAILED DESCRIPTION OF THE INVENTION

Figure 1:
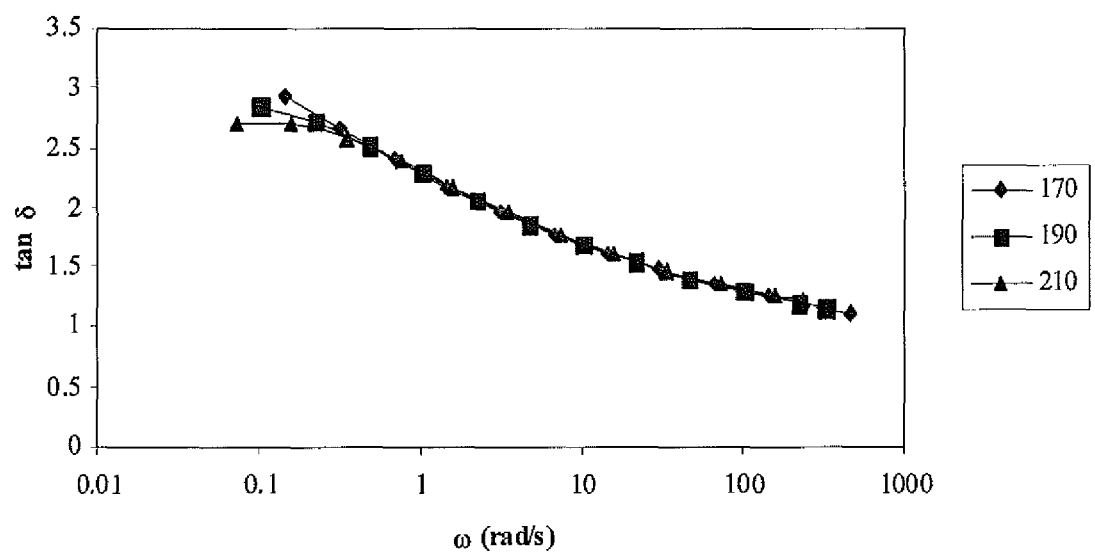
FIG. 1 represents for example 1, tan(δ) as a function of frequency, expressed in rad/s at temperatures of 170, 190 and 210° C., after applying an horizontal shift to the 170 and 210° C. values in order to optimise on the 190° C. measurements.

The present invention discloses a polyethylene that is characterised by simultaneously having:
a) a well-defined content of short chain branching consisting primarily of methyl groups, in the absence of added comonomer in the polymerisation reactor; and
b) an activation energy of less than 50 kJ/mole.

The polyethylene of the present invention is characterised by a well-defined number of short chain branching, of at least 20 short chain branches per 1000 methylene groups. Preferably, the number of short chain branches is at most 80, more preferably of at most 70 or 60, even more preferably of at most 50, still even more preferably of at most 40, and most preferably of at most 30 short chain branches per 1000 methylene groups. These short branches comprise at least 70% of methyl groups, 10% of ethyl groups, the remaining 20% being split between propyl, butyl and amyl groups. They are substantially linear with a negligible amount of long chain branching. For the purposes of the present application a short chain branch is considered to comprise from 1 to 5 carbon atoms. Representative examples of short chain branches are methyl, ethyl, propyl, butyl, pentyl and amyl groups.

Interestingly, the polyethylene of the present invention seems not have the very narrow molecular weight distribution typically observed for polyethylenes produced with single-site polymerization catalysts. Preferably, the polyethylene of the present invention is characterized by a molecular weight distribution, as defined by the ratio $M_w/M_n$ of the weight average molecular weight $M_w$ and the number average molecular weight $M_n$, of at least 2.5, more preferably of at least 3.0 and most preferably of at least 3.5. Preferably, the molecular weight distribution is at most 6.0, more preferably at most 5.5, and most preferably at most 5.0. Molecular weights, and hence the molecular weight distribution, may be determined by size exclusion chromatography (SEC), such as for example by gel permeation chromatography (GPC), as indicated in the examples. It is noted that in the present application the terms size exclusion chromatography (SEC) and gel permeation chromatography (GPC) are used synonymously.

The polyethylene of the present invention is further characterised by low activation energy of less than 50 kJ/mole, preferably of less than 40 kJ/mole and more preferably of less than 30 kJ/mole. This type of activation energy is of the order of, but slightly higher than that of purely linear polyethylene typically of the order of 25 kJ/mole, as it has SCB. These activation energies are calculated on the basis of the best horizontal shift of tan(b) for RDA measurements between 0.1 rad/s and 100 rad/s at various temperatures.

The polyethylene according to the present invention is further characterised by rheological dynamical analysis (RDA) measurements carried out at frequencies ranging between 0.1 and 320 rad/s and at temperatures of 170, 190 and 210° C. respectively. Such measurements provide an independent determination of the horizontal activation energy. The horizontal activation energy is determined by the superposition of the tan($\delta$)=f($\omega$) functions, measured at different temperatures using the method described in Mavridis and Shroft for the determination of the "horizontal activation energy" (H. Mavridis and R. N. Shroft, in Polymer Engineering and Science, 32, 1778, 1992).

Certain features of the new polymers need however explaining.

Figure 2:
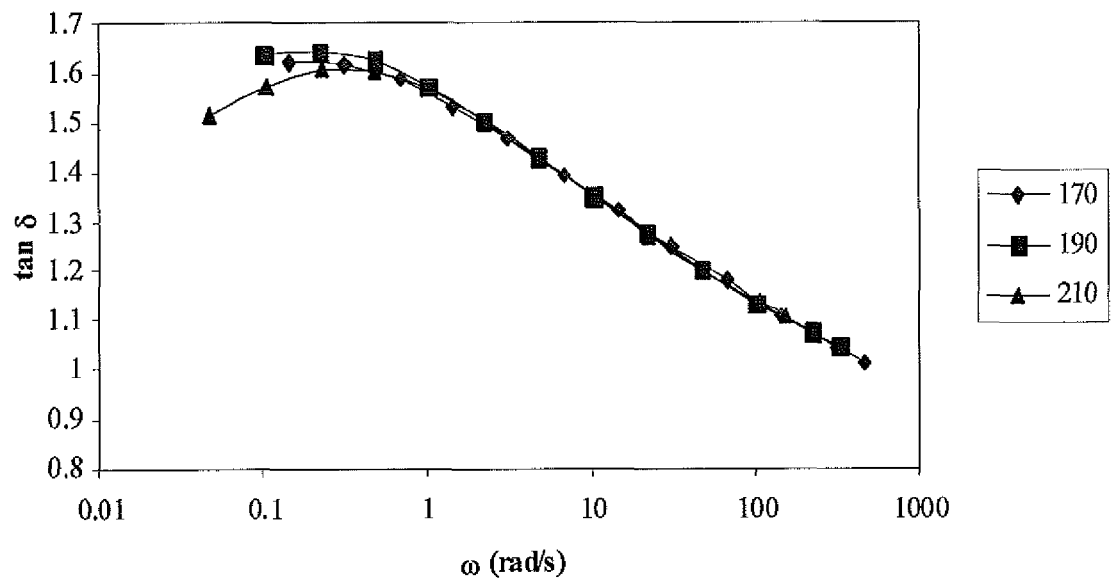
FIG. 2 represents for example 2, tan(δ) as a function of frequency, expressed in rad/s at temperatures of 170, 190 and 210° C., after applying an horizontal shift to the 170 and 210° C. values in order to optimise on the 190° C. measurements.

The superposition of the tan($\delta$)=f($\omega$) functions, measured at different temperatures is displayed in FIGS. 1 and 2. The superposition is perfect at frequencies of more than 1 rad/s, but between 0.1 and 1 rad/s, the curves diverge.

The values of the long chain branching index $g_{rheo}$ are of less than 1 indicating that the polymer is not linear, and therefore in disagreement with the observations derived from the horizontal activation energy. Indeed, linear polymers have a value of $g_{rheo}$ close to 1.

These seemingly conflicting observations can be reconciled by a specific molecular structure wherein the few long chain branches are located only on the high molecular weight chains.

The relaxation spectrum associated with polymers having such long chain branching distribution can be split into 2 different zones:

1. A slow relaxation times zone wherein the dominant phenomena are those associated with linear chains reputation.
2. A high relaxation times zone wherein the dominant phenomena are those associated with long chain branches.

That separation can explain the time-temperature superposition procedure performed with RDA measurements above 1 rad/s. It can also explain that the activation energy calculated in the frequency range above 1 rad/s is close to that of linear polyethylene samples.

Such a structure is particularly beneficial in terms of mechanical properties.

From a topological point of view, it is known that a molecule with long chain branching contains at least one connection point that is a ternary or a quaternary carbon and lateral branches of variable lengths above the minimum entanglement molecular mass. Without wishing to be bound by a theory, it is believed that during crystallisation of the polymer, the connection points have a very restricted mobility and may be at the origin of induced local constraints in the solid state. This is detrimental to mechanical properties as such local constraints are believed to create initial crazes, badly affecting properties such as stress-crack resistance. Lateral long branches are however very advantageous for other mechanical properties as they are at the origin of tie-molecules. In addition, the longer the branches, the highest the number of tie-molecules they can induce per branch, and the highest the number of connected lamellae. This is favourable to long term creep properties, or impact properties. The polyethylene of the present invention offers therefore a very appealing long chain branch structure as it has only a few long branches located on high molecular weight chains.

In this description, the long chain branching index $g_{rheo}$ is determined from measurements of gel permeation chromatography (GPC) and RDA. It is fully described in WO2008/113680 and is summarized here.

LCB concentration is determined through its effect on enhancement of zero-shear viscosity when LCB concentration is too low to be detected by conventional techniques. Enhancement of zero shear viscosity by LCB is quantified as follows:

$$g_{rheo}(PE) = \frac{M_w(SEC)}{M_w(\eta_0, MWD, SCB)}$$

wherein SEC stands for size exclusion chromatography. $M_w$(SEC) consequentially denotes the weight average molecular weight determined by SEC. GPC separates particles based on their size or hydrodynamic volume. Separation occurs via the use of porous beads packed in a column, wherein small particles enter the pores easily and therefore spend a long time in these pores and wherein conversely, large particles spend little if any time in the pores and are eluted quickly. All columns have a range of molecular weights that can be separated. GPC is often used to determine the relative molecular weight of polymer samples as well as the distribution of molecular weights.

Polystyrene standards with polydispersion index of less than 1.2 are typically used to calibrate the GPC. $M_w(\eta_0, MWD, SCB)$ denotes the weight average molecular weight determined from the zero shear viscosity $\eta_0$, which is estimated by fitting with Carreau-Yasuda flow curve ($\eta$-W) at a temperature of 190° C., obtained by oscillatory shear rheology on ARES equipment (manufactured by TA Instruments) in the linear viscoelasticity domain, including effects of short chain branching (SCB) and molecular weight distribution (MWD).

In the present method, $g_{rheo}$ is equal to 1 for linear PE and decreases with increasing amount of LCB.

Significant improvement in zero shear viscosity prediction as function of molecular weight can be obtained by including effects of short chain branching (SCB) and molecular weight distribution (MWD), defined as the ratio $M_w/M_n$ of the weight average molecular weight $M_w$ over the number average molecular weight $M_n$.

The presence of LCB can be detected at very low LCB concentration. In practice, $g_{rheo}$ of 0.95 and below can be associated with the presence of LCB.

The present invention also discloses a process for homo- or co-polymerising ethylene that comprises the steps of:
a) supporting a late transition metal catalyst component onto an activating support that comprises at least 10 wt % of aluminium, based on the weight of said activating support;
b) injecting said activated catalyst system in the polymerisation reactor with ethylene monomer, in the absence of added comonomer
c) injecting a scavenger selected from trialkylaluminum in the polymerisation reactor simultaneously with or before or after step b)
d) maintaining at a polymerisation temperature of at least 70° C.; and
e) retrieving a polyethylene product.

The late transition metal complex is a compound of formula $LMX_n$ wherein L is a neutral bidentate ligand, M a metal of group 8 to 10 of the Periodic Table, X is the same or different and can be a halogen, alcoholate or hydrocarbyl, and n is the valence of M.

The preferred metal is selected from Ni, Pd, Fe and Co, more preferably, it is Ni.

The preferred catalyst component according to the present invention is a nickel based compound prepared from a bidentate alpha-diimine ligand. Most preferably it is BlAcNp(Mes)NiBr$_2$, the chemical formula of which is given in the examples.

The support is preferably silica treated by an activating agent.

Preferably, said silica is characterized by a surface area of at least 150 m$^2$/g, more preferably of at least 200 m$^2$/g, and most preferably of at least 250 m$^2$/g. Preferably the surface area of the silica is at most 700 m$^2$/g, more preferably at most 600 m$^2$/g, even more preferably at most 500 m$^2$/g or 400 m$^2$/g, still even more preferably at most 350 m$^2$/g, and most preferably at most 300 m$^2$/g.

Preferably, said silica is characterized by an average pore diameter of at least 100 Å, more preferably of at least 150 Å, even more preferably of at least 200 Å, and most preferably of at least 220 Å. Preferably, the average pore diameter is at most 500 Å, more preferably at most 400 Å, even more preferably at most 350 Å, still even more preferably at most 300 Å and most preferably at most 280 Å.

Surface area and average pore diameter are determined using nitrogen as adsorbate for the measurement of adsorption and desorption Isotherms. The data Is then used for the calculation, following the BET model, of surface area and pore diameter. The respective test methods are given in the examples.

The preferred activating agent Is an aluminium or boron-containing compound. Preferably it is an aluminoxane of formula

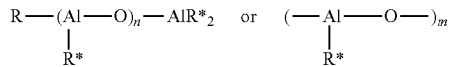

More preferably, it is methylaluminoxane (MAO).

Preferably, the activating support has an aluminium content ranging between 10 and 20 wt %.

The solvent for supporting the transition metal complex depends upon the choice of activating agent. If the activating agent is MAO, the preferred solvent is toluene and if it is a borate, the solvent can be selected from toluene or CH$_2$Cl$_2$.

The trialkylaluminums used as scavengers in the present application preferably have alkyl groups with 1 to 10 carbon atoms. Examples of suited trialkylaluminums are trimethyl aluminium, triethyl aluminium, tri-n-butyl aluminium and triisobutyl aluminium (TIBAL). The scavenger is preferably triisobutyl aluminium (TIBAL).

The amount of catalyst component ranges between 1 and 4 wt % based on the weight of the supported catalyst system, preferably it is of at most 2 wt %.

Polymerisation can be carried out in gas phase or slurry conditions.

The pressure in the reactor can typically vary between 8 and 50 bars. For slurry polymerisation, it varies preferably between 20 and 25 bars.

The polymerisation temperature can range between 70 and 90° C., preferably between 75 and 85° C.

The amount of scavenger can range from 5 to 500 ppm, based on the weight of diluent in the reactor.

The diluent for polymerisation is generally an alkane, preferably an alkane with 1 to 10 carbon atoms, more preferably an alkane selected from the groups consisting of propane, butane, isobutane, pentane, hexane, heptane, cyclopentane, cyclohexane, octane and isooctane. Still even more preferably the alkane is Isobutane or heptane. Most preferably the alkane is isobutane.

EXAMPLES

Molecular weights are determined by Size Exclusion Chromatography (SEC) at high temperature (145° C.). A 10 mg polypropylene or polyethylene sample is dissolved at 16° C. In 10 ml of trichlorobenzene (technical grade) for 1 hour. Analytical conditions for the GPCV 2000 from WATERS are:
Injection volume: +/−400 µl
Automatic sample preparation and injector temperature: 160° C.
Column temperature: 145° C.
Detector temperature: 160° C.
Column set: 2 Shodex AT-806MS and 1 Styragel HT6E
Flow rate: 1 ml/min
Detector: Infrared detector (2800-3000 cm$^{-1}$)
Calibration: Narrow standards of polystyrene (commercially available)
Calculation for polyethylene: Based on Mark-Houwink relation ($\log_{10}(M_E)=0.965909*\log_{10}(M_{PS})-0.28264$); with cut off on the low molecular weight end at $M_{PE}=1000$.

The molecular weight distribution (MWD) is then calculated as $M_w/M_n$.

Surface area and pore diameter of the silica are determined in accordance with ASTM D 4365, ASTM D 4222 and ASTM D 4641.

Determination of branches: $^{13}$C-NMR analysis is performed using a 400 MHz Bruker NMR spectrometer under conditions such that the signal intensity in the spectrum is directly proportional to the total number of contributing carbon atoms in the sample. Such conditions are well known to the skilled person and include for example sufficient relaxation time etc. In practice the intensity of a signal is obtained from its integral, i.e. the corresponding area. The data is acquired using proton decoupling, 4000 scans per spectrum, a pulse repetition delay of 20 seconds and a spectral width of 26000 Hz. The sample is prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene (C$_6$D$_6$, spectroscopic grade) and a minor amount of hexamethyldisiloxane (HMDS, 99.5+%), with HMDS serving as internal standard. To give an example, about 200 mg of polymer are dissolved in 2.0 ml of TCB, followed by addition of 0.5 ml of C$_6$D$_6$ and 2 to 3 drops of HMDS.

Following data acquisition the chemical shifts are referenced to the signal of the internal standard HMDS, which is assigned a value of 2.03 ppm. Assignment of the respective chemical shifts is then done based on literature references.

Determination of activation energy: RDA measurements were carried out on ARES equipment (manufactured by TA Instruments) at frequencies ranging between 0.1 and 320 rad/s and at temperatures of 170, 190 and 210° C. respectively. Such measurements provide an independent determination of the horizontal activation energy. The horizontal activation energy is determined by the superposition of the $\tan(\delta)=f(\omega)$ functions, measured at different temperatures using the method described in Mavrdis and Shroff for the determination of the "horizontal activation energy" (H. Mavridis and R. N. Shroft, in Polymer Engineering and Science, 32, 1778, 1992).

Example 1

The late transition metal compound was BlAcNp(Mes)NiBr2 represented by formula

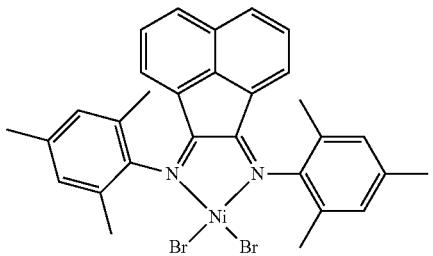

It was supported on silica support Sylopol 952×1836 commercially available from Grace. Said support has a surface area of 317 m$^2$/g, a d50 of 40 μm and a pore diameter of 247 Å.

The support was activated in toluene with methyl aluminoxane (MAO) in a weight ratio support/MAO of 1:0.6.

The catalyst component was impregnated on the activating support, with a loading of 2 wt %, based on the weight of the loaded supported catalytic system.

The scavenger was TIBAL and the polymerisation solvent was Isobutane.

The polymerisation parameters are summarized in Table I displaying the catalyst loading on the support in wt % of catalyst component based on the weight of the loaded supported catalytic system, the amount of scavenger in ppm, the pressure in bars, the temperature in ° C. and the activity expressed in grams of polymer per gram of supported catalyst system per hour.

The polymer properties are displayed in Tables II and III.

Example 2

That example was carried out using the same conditions as those of example 1 except that a smaller amount of scavenger was used as shown in Table I, 60 ppm Instead of 300 ppm.

Example 3 (Comparative)

This example reproduces the conditions used Example 1 of prior art document US-2006/0199727, using a silica support XPO 2113 with a surface area of 524 m$^2$/g, a d50 of 55.9 μm and a mean pore diameter of 114 Å.

The catalyst component was the same as that of the present Invention, but the activated support was different, it contained less aluminium than that of the present invention, 5 wt % versus 15 wt %, and the catalyst loading on the support was of 10 wt % therefore higher than in the examples according to the Invention where it was of 2 wt %.

The activating agent used for preparing the support was trimethylaluminum.

The solvent used for supporting was dichloromethane and the polymerisation solvent was heptane.

The polymerisation conditions are reported in Table I and the results are summarized in Tables II and III.

It must be noted that the polymerisation temperature and pressure were smaller than those of the present invention for the same percentage of ethylene in the solvent.

TABLE I

| Example | cata. loading wt % | scavenger ppm | pressure bar | temperature ° C. | activity* g/g/h |
|---|---|---|---|---|---|
| 1 | 2 | 300 | 22 | 80 | 42 |
| 2 | 2 | 60 | 22 | 80 | 61 |
| 3 | 10 | 1500 | 16 | 60 | 485 |

The distribution of short and long chain branching determined by $^{13}$C RMN in each example was as follows.

In example 1.

| Branching/1000 CH2 | |
|---|---|
| Total branching | 24.8 |
| isolated methyl branches | 14.9 |
| methyl 1,4 branches | 1.5 |
| methyl 1,5 branches | 0.2 |
| methyl 1,6 branches | 1.2 |
| Total methyl branches | 17.8 |
| Ethyl branches | 2.6 |
| Propyl branches | 1.4 |
| Butyl branches | 1.0 |
| Amyl branches | 0.9 |
| NL (1,4) branches | 0.3 |
| isolated NL branches | 0.7 |
| Total branches with length equal to or higher than 6 carbon atoms | 1.0 |

In example 2.

| Branching/1000 CH2 | |
|---|---|
| Total branching | 24.5 |
| isolated methyl branches | 14.4 |
| methyl 1,4 branches | 1.6 |
| methyl 1,5 branches | 0.5 |
| methyl 1,6 branches | 1.3 |
| Total methyl branches | 17.7 |
| Ethyl branches | 2.7 |
| Propyl branches | 1.5 |
| Butyl branches | 1.2 |
| Amyl branches | 0.8 |
| NL (1,4) branches | 0.3 |
| isolated NL branches | 0.3 |
| Total branches with length equal to or higher than 6 carbon atoms | 0.6 |

In comparative example 3.

| Branching/1000 CH2 | |
|---|---|
| Total branching | 25.1 |
| isolated methyl branches | 12.3 |
| methyl 1,4 branches | 1.3 |
| methyl 1,5 branches | 0.4 |
| methyl 1,6 branches | 2.1 |
| Total methyl branches | 16.1 |
| Ethyl branches | 2.4 |
| Propyl branches | 1.7 |
| Butyl branches | 1.6 |
| Amyl branches | 1.1 |
| NL (1,4) branches | 0.4 |
| isolated NL branches | 1.8 |
| Total branches with length equal to or higher than 6 carbon atoms | 2.2 |

As discussed in the description, it can be seen that the amount and distribution of short chain branching is very similar in all three examples, but the amount of branches with length equal to or higher than 6 carbon atoms is significantly smaller in examples 1 and 2, according to the present invention, than in comparative example 3.

TABLE II

| Example | Mn Da | Mw Da | Mz Da | Mw/Mn | Mz/Mw | Tmelt °C. | density g/cc |
|---|---|---|---|---|---|---|---|
| 1 | 18200 | 75000 | 444000 | 4.1 | 5.9 | 101.4/119.6 | 0.910 |
| 2 | 17600 | 71700 | 402000 | 4.1 | 5.6 | 100.9/118.8 | 0.909 |
| 3 | 21800 | 66900 | 398000 | 3.1 | 6.0 | 99.2/121.8 | 0.914 |

TABLE III

Figure 3:
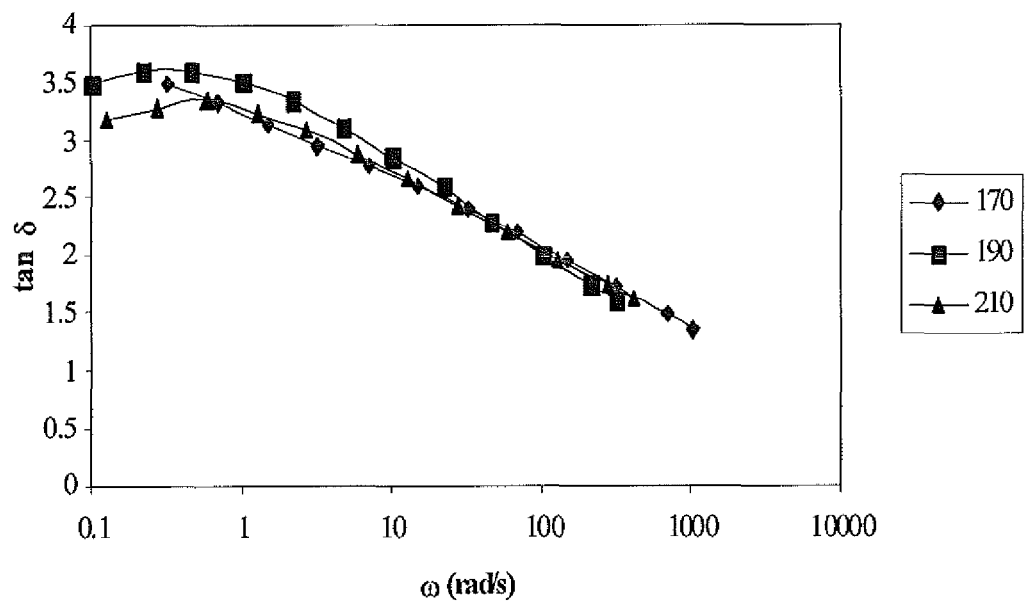
FIG. 3 represents for example 3, tan(δ) as a function of frequency, expressed in rad/s at temperatures of 170, 190 and 210° C., after applying an horizontal shift to the 170 and 210° C. values in order to optimise on the 190° C. measurements.

| | Ea | 170° C. | | 190° C. | | 210° C. | | |
|---|---|---|---|---|---|---|---|---|
| Ex | kJ/mole | $\eta_{0.1}$ ra/s | $\eta_{100}$ ra/s | $\eta_{0.1}$ ra/s | $\eta_{100}$ ra/s | $\eta_{0.1}$ ra/s | $\eta_{100}$ ra/s | grheo |
| 1 | 37.4 | 7156 | 489 | 5581 | 399 | 5259 | 394 | 0.797 |
| 2 | 28.5 | 5270 | 609 | 4004 | 492 | 2814 | 372 | 0.674 |
| 3 | 108.6 | 2911 | 594 | 1281 | 329 | 1529 | 356 | 0.783 | tan(δ) as a function of frequency ω is reported in FIGS. 1, 2 and 3 respectively for examples 1, 2 and 3. It must be noted that these figures include an horizontal shift for measurements carried out at 170 and 210° C. in order to align them to those carried out at 190° C. It can be observed that the curves of example 3 do not exhibit the same excellent superposition at frequencies higher than 1 rad/s as those of examples 1 and 2. Without wishing to be bound by a theory, it is believed that such superposition problem in RDA measurements describing the polymer of example 3 is the evidence of the influence, in addition to the linear chains, of long chain branching effect in the frequency range higher than 1 rad/s. In the frequency range higher than 1 rad/s, the absence of superposition problems in RDA measurements describing examples 1 and 2 is associated to the absence of long chain branching effect in the high frequency range.

The invention claimed is:

1. Polyethylene characterised by simultaneously having:
    a content of short chain branching of at least 20 short chain branches per 1000 methylene groups;
    an activation energy of less than 50 kJ/mole; and
    a long chain branching index $g_{rheo}$ of less than 1, wherein the short chain branches of the polyethylene primarily include methyl groups.

2. The polyethylene of claim 1, wherein the polyethylene has a content of short chain branching of at most 80 short chain branches per 1000 methylene groups.

3. The polyethylene of claim 1, wherein the polyethylene has a molecular weight distribution, defined as $M_w/M_n$, of at least 2.5, determined by size exclusion chromatography.

4. The polyethylene of claim 1, wherein the activation energy is at most 40 kJ/mole.

5. The polyethylene of claim 1, wherein the activation energy is greater than 25 kJ/mole.

6. The polyethylene of claim 1, wherein the polyethylene has a molecular weight distribution, defined as $M_w/M_n$, of at most 6.0, determined by size exclusion chromatography.

7. The polyethylene of claim 1, wherein the polyethylene is produced in the presence of an activated catalyst system comprising a late transition metal catalyst component supported on an activating support, wherein the activating support comprises at least 10 wt % of aluminium, based on a total weight of the activating support.

8. The polyethylene of claim 7, wherein the polyethylene is produced in the presence of a scavenger selected from trialkylaluminiums.

9. The polyethylene of claim 8, wherein the polyethylene is produced at a polymerisation temperature of at least 70° C.

10. The polyethylene of claim 7, wherein the late transition metal catalyst component is a compound of formula $LMX^n$, wherein L is a neutral bidentate ligand, M is a metal of group 8 to 10 of the Periodic Table, each X is the same or different and is a halogen, alcoholate, or hydrocarbyl, and n is the valence of M.

11. The polyethylene of claim 7, wherein the activating support comprises silica having a surface area of at least 150 $m^2/g$ and at most 700 $m^2/g$, an average pore diameter of at least 100 Å and at most 500 Å.

12. The polyethylene of claim 7, wherein the activating support comprises at between 10 wt % and 20 wt % of aluminium, based on the total weight of the activating support.

13. The polyethylene of claim 7, wherein the late transition metal catalyst component is $BIAcNp(Mes)NiBr_2$.

14. Polyethylene characterised by simultaneously having:
    a content of short chain branching of at least 20 short chain branches per 1000 methylene groups;
    an activation energy of less than 50 kJ/mole; and
    a long chain branching index $g_{rheo}$ of less than 1, wherein the short chain branches include methyl groups in an amount of at least 70% of the total short chain branches.

15. Polyethylene characterised by simultaneously having:
    a content of short chain branching of at least 20 short chain branches per 1000 methylene groups;
    an activation energy of less than 50 kJ/mole; and
    a long chain branching index $g_{rheo}$ of less than 1, wherein the short chain branches include of ethyl groups in an amount of 10% of the total short chain branches.

16. The polyethylene of claim 15, wherein the short chain branches include methyl groups in an amount of at least 70% of the total short branches, and wherein the remaining 20% of the short chain branches include propyl groups, butyl groups, and amyl groups.

17. Polyethylene characterised by simultaneously having:
    a content of short chain branching of at least 20 and at most 80 short chain branches per 1000 methylene groups, wherein short chain branches have from 1 to 5 carbon atoms, and wherein the short chain branches include methyl groups in an amount of at least 70% of the total short chain branches;
    an activation energy of greater than 25 kJ/mole and less than 50 kJ/mole;
    a long chain branching index $g_{rheo}$ of less than 1; and
    a molecular weight distribution, defined as $M_w/M_n$, of at least 2.5 and at most 6.0, determined by size exclusion chromatography;
    wherein the polyethylene is produced in the presence of an activated catalyst system comprising a late transition metal catalyst component supported on an activating support, wherein the activating support comprises at least 10 wt % of aluminium, based on a total weight of the activating support.

* * * * *